US008706654B2

(12) United States Patent
Bertogg

(10) Patent No.: US 8,706,654 B2
(45) Date of Patent: Apr. 22, 2014

(54) EARTHQUAKE DAMAGE PREDICTION AND PREVENTION SYSTEM AND METHOD THEREOF

(75) Inventor: Martin Bertogg, Zurich (CH)

(73) Assignee: Swiss Reinsurance Company Ltd., Zuerich (CH)

( * ) Notice: Subject to any disclaimer, the term of this patent is extended or adjusted under 35 U.S.C. 154(b) by 400 days.

(21) Appl. No.: 13/059,136

(22) PCT Filed: Jul. 28, 2009

(86) PCT No.: PCT/EP2009/059752
§ 371 (c)(1),
(2), (4) Date: Jun. 2, 2011

(87) PCT Pub. No.: WO2010/020526
PCT Pub. Date: Feb. 25, 2010

(65) Prior Publication Data
US 2011/0270793 A1 Nov. 3, 2011

(30) Foreign Application Priority Data

Aug. 21, 2008 (CH) .................. PCT/CH2008/000353

(51) Int. Cl.
*G06F 15/18* (2006.01)
(52) U.S. Cl.
USPC .......................................................... 706/12
(58) Field of Classification Search
USPC .................................. 706/12, 15, 20, 45, 62
See application file for complete search history.

(56) References Cited

U.S. PATENT DOCUMENTS

| | | | | |
|---|---|---|---|---|
| 5,490,062 A | * | 2/1996 | Leach et al. | 702/15 |
| 5,910,763 A | * | 6/1999 | Flanagan | 340/286.02 |
| 7,277,797 B1 | * | 10/2007 | Kunitsyn et al. | 702/15 |
| 2009/0303070 A1 | * | 12/2009 | Zhang et al. | 340/690 |

OTHER PUBLICATIONS

Chen et al., Earthquake Engineering Handbook, 2002, Edited by Wai-Fah Chen and Charles Scawthorn CRC Press, Chapters, 1, 2, 8, 31, 32, 34.*

* cited by examiner

*Primary Examiner* — David Vincent
(74) *Attorney, Agent, or Firm* — Oblon, Spivak, McClelland, Maier & Neustadt, L.L.P.

(57) ABSTRACT

An earthquake damage prediction and prevention system for determining an impact or damage caused by an earthquake to objects associated with different geographical locations. A central unit with a filter module selects and collects earthquake related data of a plurality of network units. At least one impact ratio table is stored with a first data structure for storing geographical and/or topographical data coordinates of the different geographical locations. The geometric distances of the geographical locations from a hypocenter/epicenter are generated by an intensity calculation module with a coordinates processor. Local intensity values based upon the generated geometric distances and a given earthquake magnitude of a stored parameterization including variable weight parameters are generated by a propagation calculation unit of the intensity calculation module, whereas the generated geometric distances are stored assigned to the corresponding geographical locations by a second data structure of the impact ratio table.

18 Claims, 5 Drawing Sheets

EARTHQUAKE DAMAGE PREDICTION AND PREVENTION SYSTEM AND METHOD THEREOF

FIELD OF THE INVENTION

The present invention relates to an earthquake damage prediction and prevention system and a method thereof. In Particularly, a impact index parameter indicative of the impact or damage caused by an earthquake is generated by the system whereas activation or alarm signals are generated based on the variable index parameter and transmitted to appropriate alarm and damage prevention or damage intervention devices. Specifically, the present invention relates to a system and a method for determining an impact index indicative of the impact or damage caused by an earthquake to a pre-defined portfolio of objects or values of property or non-property nature, associated with different geographical and/or geological locations.

BACKGROUND OF THE INVENTION

In the state of the art, an earthquake prediction system or an earthquake damage prediction system is a system capable of generating prediction that an earthquake of a specific magnitude will occur in a particular place at a particular time (or ranges thereof) and which damage it will cause to what kind of objects, respectively. Despite considerable research and development efforts by engineer and seismologists, scientifically reproducible predictions are difficult to make and cannot yet be made to a specific hour, day, or month. Only for well-understood geological faults, seismic hazard assessment maps can estimate the probability that an earthquake of a given size will affect a given location over a certain number of years and what kind of damage it can cause to different structured objects at that location. Once an earthquake has already begun, there are early warning devices in the state of the art which can provide a few seconds' warning before major shaking arrives at a given location. This technology takes advantage of the different speeds of propagation of the various types of vibrations produced. Aftershocks are also likely after a major quake, and are commonly planned for in earthquake disaster response protocols.

Experts do advise general earthquake preparedness, especially in areas known to experience frequent or large quakes, to prevent injury, death, and property damage if a quake occurs with or without warning. To have the proper preparedness, it is necessary to predict the impact of a possible earthquake to the objects placed at the location. In the state of the art, the systems use so called earthquake impact (or damage) index to quantitatively approximate the impact or damage caused by an earthquake to a pre-defined object or even portfolio of objects or of values of property or non-property nature, associated with different geographical locations, e.g. damages relating to buildings, bridges, highways, power lines, communication lines, manufacturing plants or power plants, but also non-physical values, e.g. business interruption, contingent business interruption values or exposed population, based solely on physically measured and publicly available parameters of the earthquake phenomenon itself. The impact index parameters can then by used to electronically generate appropriate alarm or activation signals, which can be transmitted to correlated modules and alarm devices.

An earthquake impact index parameter is usually based on a pre-defined set of rules and can be assessed immediately after the earthquake. Defining the earthquake impact index solely on a measured magnitude of the earthquake has the disadvantage that there is no consideration of the portfolio and its geographical distribution of objects. Consequently, an earthquake impact index based solely on the magnitude of the earthquake correlates poorly with the true damage caused to the assets (objects) included in the portfolio. Particularly, with an increase of the geographical area in which the geographical locations are distributed, the magnitude based impact index shows an increasingly poor correlation with the true damage. Thus, other methods use other physical parameters of an earthquake occurrence than magnitude, i.e. earthquake shaking intensity in form of peak ground acceleration or peak ground velocity. Such parameters depict in areas of the world equipped with a dense net of seismograph stations a map of the aerial extent of earthquake shaking intensity, rather than only a single point measurement of the magnitude. Combining the aerial extent of earthquake shaking intensity with the distributed portfolio of objects allows for a much better correlation of the thus deducted earthquake impact index with really occurred impact or damage to the portfolio, while not sacrificing the immediateness of applicability after the event, as well as transparency to anyone willing to set up the computing procedure. However, owing to the cost of installation and maintenance, an infrastructure with a network of geographically densely distributed seismological measurement stations is currently not available in the majority of countries.

In the effort to predict earthquakes, engineers have tried to associate an impending earthquake with such varied phenomena as seismicity patterns, electromagnetic fields, ground movement, weather conditions and unusual clouds, radon or hydrogen gas content of soil or ground water, water level in wells, animal behavior, and the phases of the moon. Many pseudoscientific theories and predictions are made, which scientific practitioners find problematic. The natural randomness of earthquakes and frequent activity in certain areas can be used to make "predictions" which may generate unwarranted credibility. These generally leave certain details unspecified, increasing the probability that the vague prediction criteria will be met, and ignore quakes that were not predicted. However, even if the prediction models are comparatively good, the propagation through different geological structures is difficult to determine and to weight within a certain region. In the state of the at there are official earthquake prediction evaluation councils which have been established e.g. in California (the California Earthquake Prediction Evaluation Council) and the federal government in the United States (the National Earthquake Prediction Evaluation Council), but have yet to endorse any method of predicting quakes as reliable. Technological evaluations methods of prediction look for the following input elements for a method: A specific location or area, a specific span of time, a specific magnitude range and/or specific probability of occurrence. Attribution to a plausible physical mechanism lends credibility, and suggests a means for future improvement. Reproducibility and statistical analysis are used to distinguish predictions, which come true due to random chance (of which a certain number are expected) versus those that have more useful predictive capability, and to validate models of long-term probability. Such models are difficult to test or validate because large earthquakes are so rare, and because earthquake activity is naturally clustered in space and time. "Predictions" which are made only after the fact are common but generally discounted.

Known prediction models in the state of the art are e.g. the emission of radon as a quake precursor. This method has still no reliable results. It is under study at NASA as of 2009. VAN is another method of earthquake prediction in the state of the art proposed by Professors Varotsos, Alexopoulos and Nomicos in the 1980s. The method is based on the detection of "seismic electric signals" (SES) via a telemetric network of conductive metal rods inserted in the ground. The method stems from theoretical predictions by P. Varotsos, a solid-state physicist at the National and Capodistrian University of Athens. It is continually refined as to the manner of identifying SES from within the abundant electric noise the VAN sensors are picking up. Researchers have claimed to be able to predict earthquakes of magnitude larger than 5, within 100 km of epicentral location, within 0.7 units of magnitude and in a 2-hour to 11-day time window. Other systems are based on measuring foreshocks, which are medium-sized earthquakes that precede major quakes. An increase in foreshock activity (combined with purported indications like ground water levels and strange animal behavior) enabled the successful evacuation a million people one day before the Feb. 4, 1975 M7.3 Haicheng earthquake by the China State Seismological Bureau. While 50% of major earthquakes are preceded by foreshocks, only about 5-10% of small earthquakes turn out to be foreshocks, leading to many false warnings. According to new systems and method by Prof. Shlomo Havlin, of Bar-Ilan University's Department of Physics, earthquakes form patterns, which can improve the ability to predict the timing of their recurrence. These systems use the "scaling" approach from physics to develop a mathematical based method to characterize earthquakes of a wide range of magnitudes whereas smaller magnitude earthquakes parameter serve as input values or initial start parameter to generate predictions about larger magnitude earthquakes. The method proposes that the recurrence of earthquakes is strongly dependent on the recurrence times of previous earthquakes. This memory effect used in the method not only provides a clue to understanding the observed clustering of earthquakes, but also suggests that delays in earthquake occurrences, as seen today in Tokyo and in San Francisco, are a natural phenomenon. One other possible method for predicting earthquakes is based on fractoluminescence. The method measures flashes of red and blue light in the sky, which accumulate often up to an hour before the earthquake. Studies have shown that upon fracturing, silica releases red and blue light for a period of about 100 milliseconds. This is attributed to the relaxation of the free bonds and unstable oxygen atoms that are left when the silicon oxygen bonds have broken due to the stresses within the rock. Finally, some methods relay on the detection of electro-magnetic emissions transmitted from earthquake regions by satellite. These systems use the fact that there have been observed strong correlations between certain types of low frequency electromagnetic activity and the seismically most active zones on the Earth. For example there was a sharp signal in the ionospheric electron density and temperature near southern Japan seven days before a 7.1 magnitude occurred there. In the state of the art, there are still other early warning systems and damage prediction systems not mentioned here. As further example may serve the patent documents JP60014316, GR1003604, GR96100433, CN1547044, JP2008165327, JP2008077299, US 2009/0164256 or US 2009/0177500. In the state of the art, efficient earthquake damage prediction and prevention systems are technically difficult to realize. They can comprise e.g. earthquake detection units or method together with units to generate propagate values of the earthquake's hypocenter or epicenter. Even within an epicenter region it is often difficult to properly weight the local impact and impact values, respectively, due to different geological formations, gating of the affected object to the ground and internal structure and assembly of the affected object. However, quickly knowing the impact of the earthquake to affected objects within a region can be important to generate and transmit correct activation signals or alarm signals to e.g. automated emergency devices or damage intervention devices or systems and/or general operating malfunction intervention devices, as for instance, monitoring devices, alarm devices or systems for direct technical intervention at the affected object. Furthermore, earthquake damage prediction and prevention systems of the date of art are not very reliable and often to slow. One of the problems of the state of the art is, that the signals of the systems can hardly be correctly weight, due to the law of large numbers i.e. of low statistic in the field of earthquakes in connection with a specific geological formation. Finally, those systems of the state of the art are expensive to realize and extremely costly in terms of labor.

TECHNICAL OBJECT

It is an object of this invention to provide a new and better earthquake damage prediction and prevention system and method which does not have the above-mentioned disadvantages of the prior art. In particular, it is an object of the present invention to provide earthquake damage prediction and prevention system and method for predicting the impact or damage caused by an earthquake to objects associated with different geographical locations which generates reliable earthquake impact signals and which can easily be weighted. The generation of the appropriate signals or vales should be time correct well in advance of an occurring earthquake. In the ideal case, the system should be self-adapting during operation. The earthquake impact index or signal should be indicative of the damage or impact caused by an earthquake to a certain object or even to a portfolio of values or objects associated with different geographical locations. In particular, it is an object of the present invention to provide an earthquake damage prediction and prevention system and method for generating impact index signals with consideration of the geographical distribution of the portfolio of values or objects. Furthermore, it is an object of the present invention to provide a earthquake damage prediction and prevention system for generating impact index signals without the need for a technically complex infrastructure having a network of geographically densely distributed seismological measurement stations.

According to the present invention, these objects are achieved particularly through the features of the independent claims. In addition, further advantageous embodiments follow from the dependent claims and the description.

SUMMARY OF THE INVENTION

In particular, these aims are achieved by the invention in that for determining an impact or damage caused by an earthquake to objects associated with different geographical locations (A,B,C,D) the earthquake damage prediction and prevention system comprises a central unit with a filter module to select and collect earthquake related data of a plurality of network units and an network interface module to access at least one of the mentioned network units by the filter module, in that the system comprises means for storing at least one impact ratio table, where as the impact ratio table comprises a first data structure for storing geographical and/or topographical data coordinates of the different geographical locations (A,B,C,D), in that the system comprises an intensity calculation module with a coordinates processor for generating the geometric distances of the geographical locations (A,B,C,D) from a hypocenter/epicenter, in that the intensity calculation module comprises an propagation calculation unit for generating local intensity values based upon the generated geometric distances and a given earthquake magnitude by means of a stored parameterization comprising variable weight parameters, whereas the generated geometric distances are stored assigned to the corresponding geographical locations (A,B,C,D) by means of a second data structure of the impact ratio table, in that the system comprises user interfaces to receive from a plurality of users at least one of the variable weight parameters and/or at least one impact ratio for different earthquake intensity levels indicative of the impact or damage caused by an earthquake to the object and/or at least one object parameter defining earthquake exposed structures of the object, and in that the system comprises an index calculation module to generate the impact index for the geographical locations (A, B, C, D) by determining in each case from the impact ratio table e impact ratio for the local intensity at the respective geographical location (A, B, C, D), and adding up the impact ratios weighted in each case by the weighting factor assigned to the respective geographical location {A, B, C, D), whereas the index calculation module comprises means for weighting the variable weight parameters and/or generated impact ratios and/or object parameter based on those received by the plurality of users. The weighting of the variable weight parameters and/or generated impact ratios and/or object parameter based on the parameter received by the plurality of users can be conducted dynamically by the system. The proposed system and method make it inter alia possible to generate the impact index based on magnitude and location parameters from a past earthquake, from an artificial earthquake scenario, and predominately from an earthquake event having occurred recently, e.g. within the contract period of a structured financial product which depends on the value of the earthquake impact index. The proposed system and method make it possible to add a new form of index measure, a parametric model index, to already existing index measures used for structured financial products. The proposed system and method use a simplified earthquake model approach as a basis for the parametric model index. The proposed system and method make it possible to simplify already existing earthquake damage prediction and prevention system, also in connection with automated systems for insurance loss and risk assessment. Specifically, after an event applicable to a particular structured financial product, the proposed method and system make it possible to generate the impact index solely based on magnitude, depth and coordinates of an earthquake (hypocenter), as published by a pre-defined seismological agency. Furthermore, the proposed method and system make it possible to generate an impact index that reflects the geographical distribution of a portfolio, without the need for a network of seismological measurement stations associated with the geographical locations included in the portfolio. In an embodiment, the weighting factors are indicative in each case of a nominal value associated with the geographical location. Furthermore, the impact (or damage) ratios weighted by the weighting factors are indicative in each case of a nominal loss (or impact) at a geographical location. Hence, the impact index is indicative of a total nominal event loss or event impact.

In an embodiment variant, the system comprises alarm means for generating and transmitting an electrical stimulus pulse to activate automated alarm systems and/or damage intervention devices. This has inter alia the advantages that the present system can be placed in a technical surrounding of self-activating damage intervention devices or systems. Even catastrophic triggered uncertainties or stock exchange fluctuation can be efficiently and actively intercepted through transmitted stimulus signals automatically generated by the system of the present invention. The automated alarm systems can e.g. be accessible and activated by the central unit of the system over the network interface allowing for their state transition triggered by definable threshold values.

In another embodiment variant, the system comprises early warning means and wherein the geographical location (A, B, C, D) are determined based on transmitted signals of the mentioned early warning means. This has inter alia the advantages that the system can react in real time on occurring catastrophic events by e.g. activating appropriate damage invention means and/or devices or even activating units automatically managing financial derivatives, as e.g. catastrophe bonds or other risk-linked securities or insurance securities. The mentioned early warning means can be located decentralized building up a grid of controlled earthquake detection centers. Furthermore the mentioned early warning means can comprise sensors to detect the emission of radon and/or a telemetric network of conductive metal rods inserted in the ground to detect seismic electric signals and/or seismic sensors to measure foreshocks of an earthquake and/or a history module comprising historical data of smaller magnitude earthquakes serving as input values and initial start parameter to the propagation calculation unit generating local intensity values for larger magnitude earthquakes based on the smaller magnitude earthquakes.

In further embodiment variant, the weighting factors are based of a nominal value associated with the geographical location (A, B, C, D), the impact ratios weighted by the weighting factors are indicative in each case of a nominal loss at a geographical location (A, B, C, D) and/or the impact index is indicative of a total nominal event loss, whereas the index calculation module comprises further means for generating an event loss factor as a ratio of an event loss exceeding the minimum total nominal event loss, but not exceeding the maximum total nominal event loss, and a difference of the maximum total nominal event loss and the minimum total nominal event loss. The system can further comprise a portfolio data store including a coverage amount for an object or a portfolio of objects, and the system further comprises a payout module for generating a payout amount by multiplying the event loss factor with the coverage amount.

In embodiment variant, the objects are particularly achieved in that, for determining an impact index indicative of the impact or damage caused by an earthquake to a portfolio of values or objects associated with different geographical locations, stored is an equation defined for calculating, for a geographical location, a local earthquake intensity, based on a given distance of the geographical location from a hypocenter of an earthquake, and a given earthquake magnitude of the earthquake. Calculating local intensity values, e.g. local shaking intensity values, makes it possible to estimate a local earthquake impact, without the requirement of seismological measurement stations at the respective geographical location. For example, the geographical locations are defined by coordinates i.e. longitude and latitude values. For the geographical locations, one or more impact ratio tables are stored. The impact ratio tables define in each case impact (or damage) ratios for different earthquake intensity levels. For example, different impact ratio tables are assigned to different geographical locations. Stored is portfolio data, which includes geographical locations and individual weighting factors assigned to the geographical locations. Calculated are geometric distances of the geographical locations from a hypocenter of an earthquake event. For the geographical locations, local intensity values are determined by using in each case the stored equation to calculate the local intensity from the magnitude of the earthquake event and the geometric distance of the respective geographical location from the hypocenter. Subsequently, the impact index is calculated for the geographical locations by determining in each case, from the impact ratio table, the impact (or damage) ratio for the local intensity at the respective geographical location, and adding up the impact (or damage) ratios, weighted in each case by the weighting factor assigned to the respective geographical location.

In an embodiment, the weighting factors are indicative in each case of a nominal value associated with the geographical location. Furthermore, the impact (or damage) ratios weighted by the weighting factors are indicative in each case of a nominal loss (or impact) at a geographical location. Hence, the impact index is indicative of a total nominal event loss or event impact.

In an embodiment, a minimum and a maximum total nominal event loss (or impact) are stored for the portfolio, and an event loss factor is calculated as a ratio of the event loss or impact exceeding the minimum total nominal event loss, but not exceeding the maximum total nominal event loss, and the difference of the maximum total nominal event loss and the minimum total nominal event loss. For example, a coverage amount is stored for the portfolio, and a payout amount is calculated by multiplying the event loss factor with the coverage amount. Thus, using the event loss factor, the actual payout can be scaled to various sizes of earthquakes, be it by not considering small earthquakes or limiting the payout for very large earthquakes.

Depending on the embodiment, provided is a user interface for receiving from a user the impact ratios for different earthquake intensity levels, the weighting factors assigned to the geographical locations, and/or parameters and mathematical operations for defining the equation.

In addition to a computer system and a computer-implemented method for determining an impact index indicative of the impact or damage caused by an earthquake to a portfolio associated with geographical locations, the present invention also relates to a computer program product including computer program code means for controlling one or more processors of a computer system such that the computer system performs the method, particularly, a computer program product including a computer readable medium containing therein the computer program code means.

Preferably, the computer program product includes computer program code means for controlling the computer such that the computer system and the computer-implemented method for determining the earthquake impact index are applicable to a structured financial product. Specifically, the computer program product includes computer program code means for controlling the computer such that the computer applies the impact index to the structured financial product.

The proposed system and method make it possible for anyone to assess the earthquake impact index right after an earthquake event (or for any conceived earthquake) defined only by magnitude, depth and coordinates. The computer program product can be distributed in an electronic format in parallel with other supporting information for the structured financial product. Thus the proposed system and method provide full transparency to investors of a structured financial product based on the impact index by making it possible for the investors to perform on their own pre- and/or post-assessments based on publicly available data.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
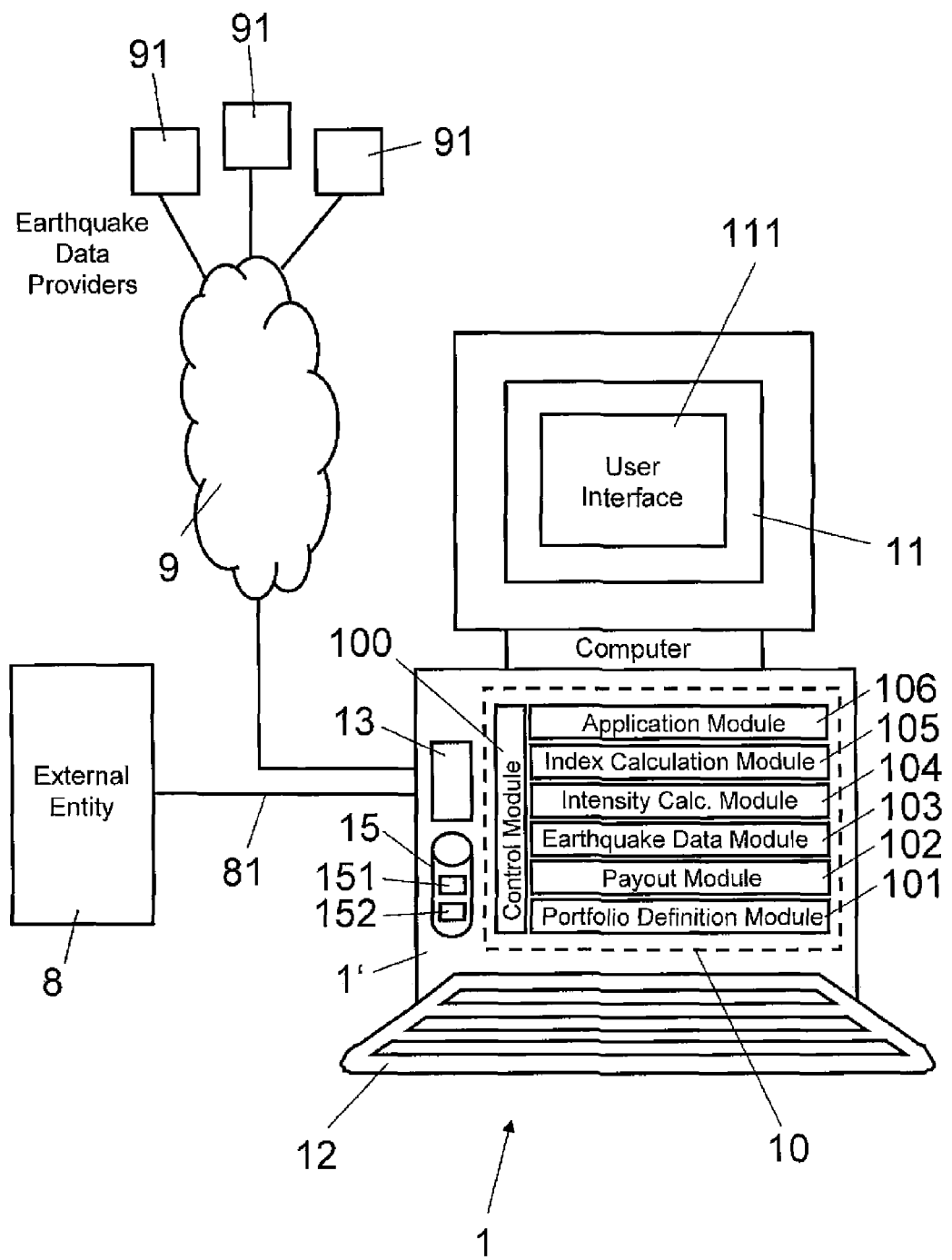
FIG. 1 shows a block diagram illustrating schematically an exemplary configuration of an earthquake damage prediction and prevention system for practicing embodiments of the present invention, said configuration comprising a processor with a display and data entry means.

In FIG. 1, reference numeral 1 refers to an earthquake damage prediction and prevention system for determining an impact index indicative of the impact or damage caused by an earthquake to an object or a portfolio of values or objects associated with geographical locations. For example, the portfolio can relate to objects or values of property or non-property nature, e.g. non-physical values such as business interruptions, contingent business interruption values or exposed population. As is illustrated in FIG. 1, the system 1 includes a processor means 1' (e.g. a computer), connected to a display 11 and to data entry means 12 such as a keyboard and/or a pointing device. The computer 1' is provided with one or more processors and is implemented as a personal computer, for example.

In FIG. 1, reference numeral 10 refers to functional modules of the earthquake damage prediction and prevention system 1: a control module 100, a portfolio definition module 101, a payout module 102, an earthquake data module 103, an intensity calculation module 104, an index calculation module 105 and an application module 106. The functional modules 10 can comprise programmed modules stored on a computer readable medium, connected fixed or removable to the processor(s) of the processor means 1'. One skilled in the art will understand, however, that the functional modules 10 can also be implemented fully or in part by means of hardware. The earthquake damage prediction and prevention system 1 further comprises for determining an impact or damage caused by an earthquake to objects associated with different geographical locations A,B,C,D a central unit with a filter module to select and collect earthquake related data of a plurality of network units and an network interface module to access at least one of the mentioned network units by the filter module. The filter module can comprise a module housing and at least one electronic, software and/or hardware based filter element. A filter element of the filter module can comprise at least one filter layer as well as collecting and/or distributing layers, which are in the sense of the data flow disposed on top of each other. In respect of the data input and output the collecting/distributing layers are open filter layers or are provided with interface means oriented in the direction of the data flow. The system 1 comprises means for storing at least one impact ratio table 151, where as the impact ratio table 151 comprises a first data structure for storing geographical and/or topographical data coordinates of the different geographical locations A, B, C, D, . . . . The different geographical locations A, B, C, D, . . . can be allocated by the system 1 e.g. to cover grid-wise a certain geographic and/or geologic region. The locations A, B, C, D, ... can also be assigned to selected objects and/or portfolio of objects, if the portfolio is concentrated within a specific region. A portfolio of objects can comprise preselected objects. The selection criteria for the preselection can be based on definable geological and/or geographic situations, their basic structure or build volumes, their values etc. or a combination of these criteria.

The earthquake damage prediction and prevention system 1 further comprises an intensity calculation module 104 with a coordinates processor for generating the geometric distances of the geographical locations A,B,C,D from a hypocenter/epicenter 2. The intensity calculation module 104 comprises an propagation calculation unit for generating local intensity values based upon the generated geometric distances and a given earthquake magnitude by means of a stored parameterization comprising variable weight parameters. The generated geometric distances are stored assigned to the corresponding geographical locations A,B,C,D by means of a second data structure of the impact ratio table 151. The propagation calculation unit for seismic wave propagation through earth can comprise at least one parameterization of one or more realistic 3-dimensional Earth models. The parameterization can be based on global or local seismology knowledge of the structure of the Earth's deep interior and or empiric propagation data. In the first case the parameterization can comprise formula describing the dynamic behavior of the planet such as mantle convection, slab subduction or hot spot activity. The parameterization can be achieved e.g. by a numerical approach comparing synthetic 3-dimensional seismograms with globally recorded data. The structural resolution of the tomographic models can e.g. be improved by exploiting the 3-dimensional wave effects of the geodynamically important regions inside the Earth by correction the mentioned parameterization. The generation of accurate prediction values by the propagation units of likely ground motion following earthquakes in seismically active regions can be based on measures (e.g. applying strict building codes) to be taken before major events. This allows weighting the operation of the propagation calculation unit automated or partially automated. Using 3-dimensional modeling parameterization allows capturing local (e.g. amplifying) effects such as low velocity zone or topography by the propagation calculation unit. These so-called site effects can also be captured by additional parameterizations for several areas at risk (e.g. San Francisco Bay Area) stored in the propagation calculation unit. Active volcanic areas show very characteristic complex ground motion, which can be recorded by the system 1 using local networks monitoring of the activity and risk of eruption. The seismically recorded signals of such special risk regions as volcanic areas comprise a structural complexity with strong 3-D heterogeneities, topography and sources in the summit region. To cope with this, the propagation calculation can e.g. comprise dedicated and specific adaptable parameterization assigned to the specific regions or geological structures.

The system 1 comprises user interfaces 111 to receive from a plurality of users at least one of the variable weight parameters and/or at least one impact ratio for different earthquake intensity levels indicative of the impact or damage caused by an earthquake to the object and/or at least one object parameter defining earthquake exposed structures of the object. The system 1 comprises an index calculation module 105 to generate the impact index for the geographical locations A, B, C, D by determining in each case from the impact ratio table 151 the impact ratio for the local intensity at the respective geographical location A, B, C, D, and adding up the impact ratios weighted in each case by the weighting factor assigned to the respective geographical location A, B, C, D, whereas the index calculation module 105 comprises means for adapting the variable weight parameters and/or generated impact ratios and/or object parameter based on those received by the plurality of users. However, the system 1 can e.g. also be operated without receiving at least one of the variable weight parameters and/or at least one impact ratio for different earthquake intensity levels indicative of the impact or damage caused by an earthquake to the object and/or at least one object parameter defining earthquake exposed structures of the object from a plurality of users. In this case, the index calculation module 105 does not adapt the variable weight parameters and/or generated impact ratios and/or object parameter based on those received by the plurality of users and the signal generation can not be done with the same accuracy.

The system can further comprise alarm means for generating and transmitting an electrical stimulus pulse to activate automated alarm systems and/or damage intervention devices. The activation can be bound to a definable threshold value of the system. As embodiment variant the threshold changes at high electric stimulus pulse rates for the automated alarm systems and/or damage intervention devices. The alarm means can further comprise a signal control generator for stimulating additional intervention potential of the evoked automated alarm systems and/or damage intervention devices. This can e.g. be realized by maintaining the common mode voltage at the stimulation signals substantially constant both before and during application of a stimulus pulse of constant current. The automated alarm systems can be accessible and enactable by the central unit of the system 1 over the network interface allowing for their state transition.

Furthermore, the system can comprise early warning means, wherein the geographical location A, B, C, D comprised by the impact ratio table 151 are determined based on transmitted signals of the mentioned early warning means. The mentioned early warning means can be decentralized located building up a grid of controlled earthquake detection centers. The early warning means can for example comprise or be realized based on sensors to detect the emission of radon and/or a telemetric network of conductive metal rods inserted in the ground to detect seismic electric signals and/or seismic sensors to measure foreshocks of an earthquake and/or a history module comprising historical data of smaller magnitude earthquakes serving as input values and initial start parameter to the propagation calculation unit generating local intensity values for larger magnitude earthquakes based on the smaller magnitude earthquakes.

The weighting factors can be based on a nominal value associated with the geographical location A, B, C, D, the impact ratios weighted by the weighting factors are indicative in each case of a nominal loss at a geographical location A, B, C, D and/or the impact index is indicative of a total nominal event loss, whereas the index calculation module 105 comprises further means for generating an event loss factor as a ratio of an event loss exceeding the minimum total nominal event loss, but not exceeding the maximum total nominal event loss, and a difference of the maximum total nominal event loss and the minimum total nominal event loss. The system 1 can comprise a portfolio data store 152 including a coverage amount for a object or a portfolio of objects, and the system 1 further comprises an at least partially automated payout module 102 for generating a payout amount by multiplying the event loss factor with the coverage amount. In an embodiment variant the user interface 111 comprises further means for receiving from the plurality of users at least one of the impact ratios for different earthquake intensity levels, the weighting factors assigned to the geographical locations A, B, C, D, and parameters and mathematical operations for defining the equation.

As is illustrated schematically in FIG. 1, the earthquake damage prediction and prevention system 1 can comprise a communication module 13 for exchanging data with one or more earthquake data providers 91 via a telecommunications network 9. The telecommunications network 9 includes a fixed network and/or a mobile radio network. By means of the communication module 13 data can be exchanged with an external entity 8, such as a printer, a display, a database, or another network unit as a computer via communication link 81. Although not illustrated, communication link 81 can be realized as a part of a telecommunications network 9. The earthquake damage prediction and prevention system 1 also includes a database 15, implemented as a relational database, a spreadsheet or another structured data file.

Figure 2:
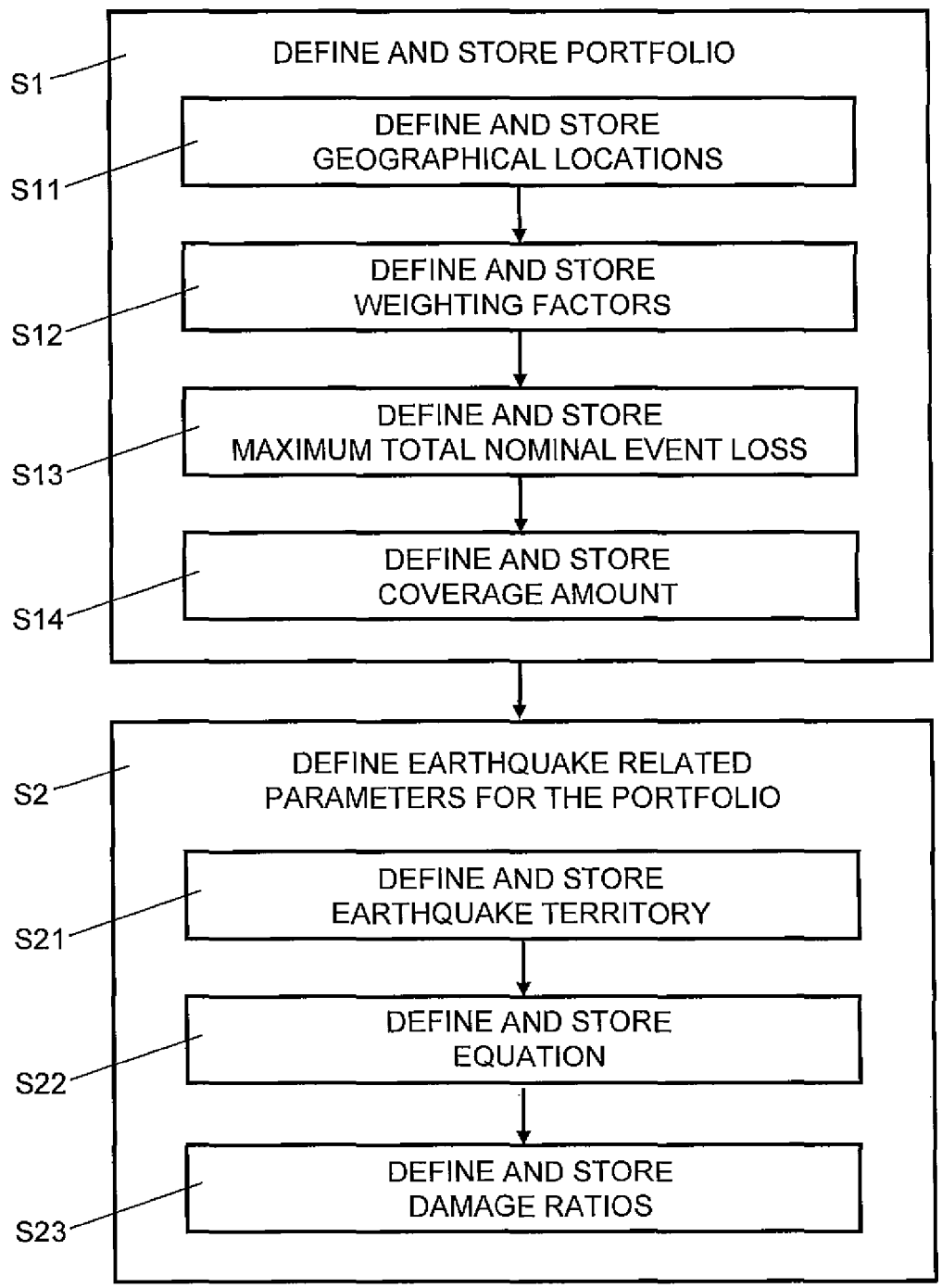
FIG. 2 shows a flow diagram illustrating an example of a sequence of preparatory steps executed according to the present invention for generating an earthquake impact index.
Figure 5:
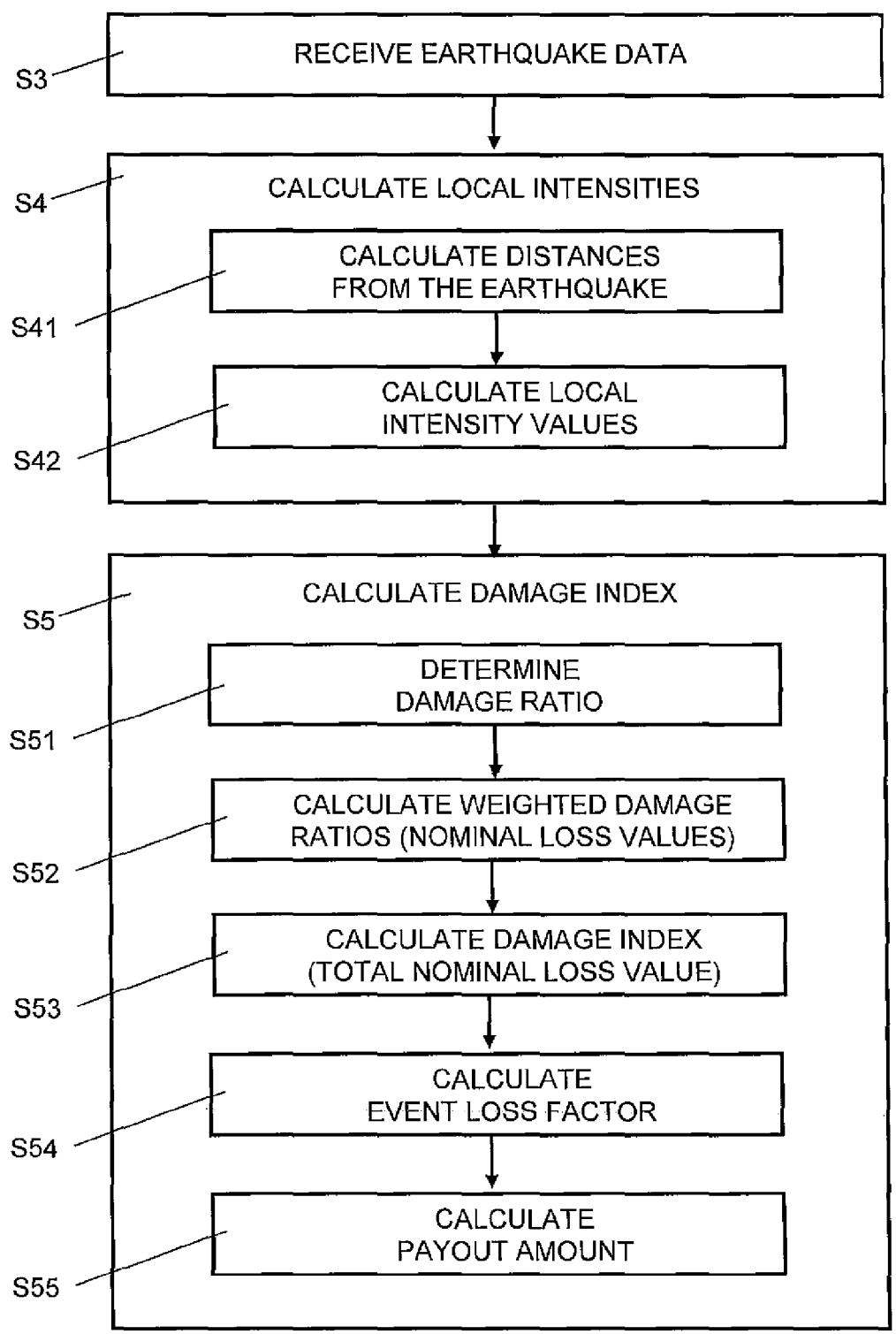
FIG. 5 shows a flow diagram illustrating an example of a sequence of steps executed according to the present invention for determining an earthquake impact index.

The control module 100 is configured to provide to the user of the earthquake damage prediction and prevention system 1 a user interface 111 for selecting and activating the functional modules 10, as well as enter various parameters described later in more detail. The user interface 111 is shown on display 11. Data and control commands are entered by the user using data entry means 12. When selecting the portfolio definition module 101, processor means 1' executes steps 51 and 52 as illustrated in FIG. 2. When selecting the earthquake data module 103, computer I' executes step S3 as illustrated in FIG. 5. When selecting a calculation option, the intensity calculation module 104 executes step S4 and the index calculation module 105 executes step S5 as illustrated in FIG. 5. The earthquake data module 103 may trigger automatically execution of calculation modules 104 and 105.

Figure 3:
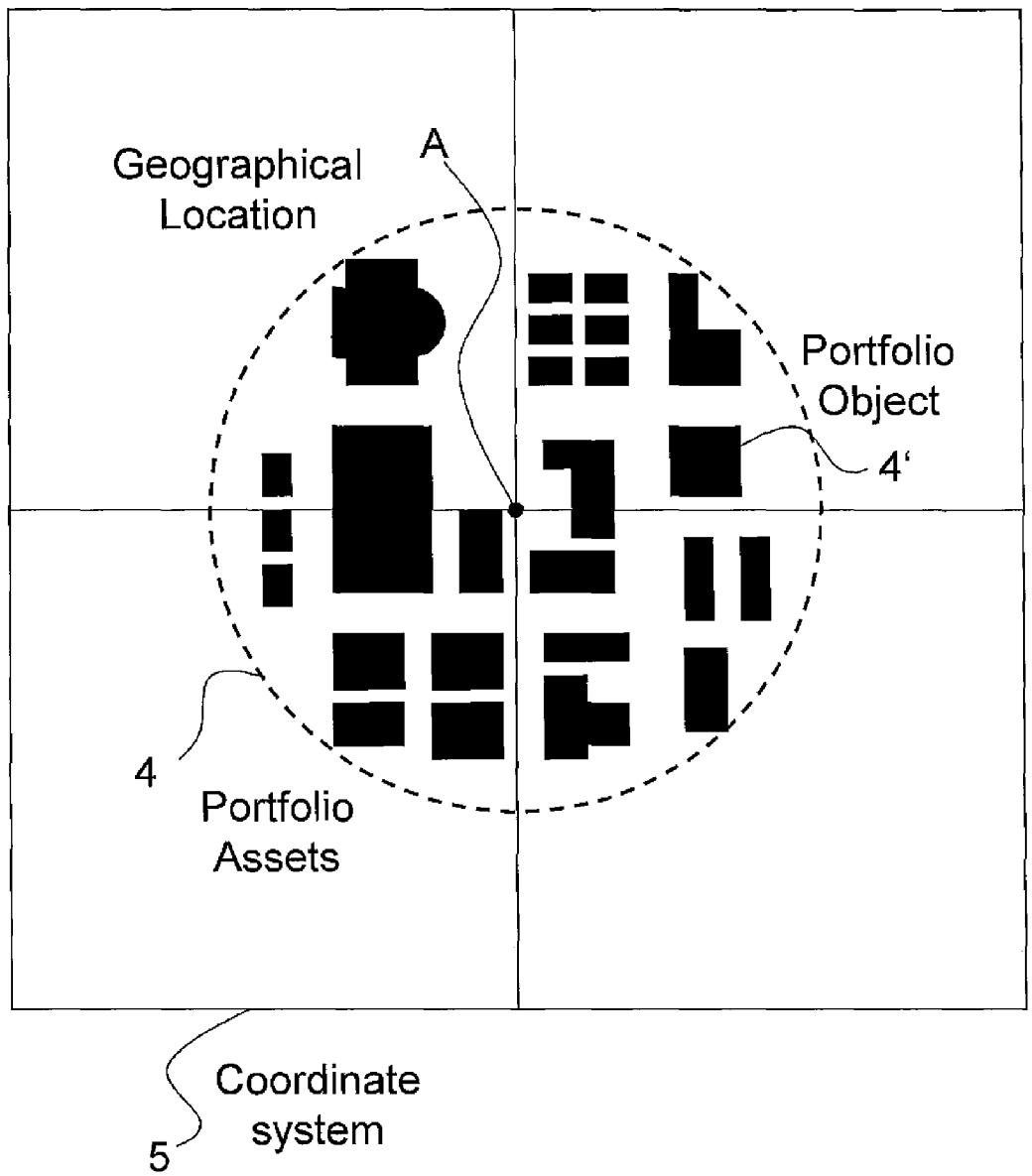
FIG. 3 shows an individual geographical location with associated portfolio assets.
Figure 4:
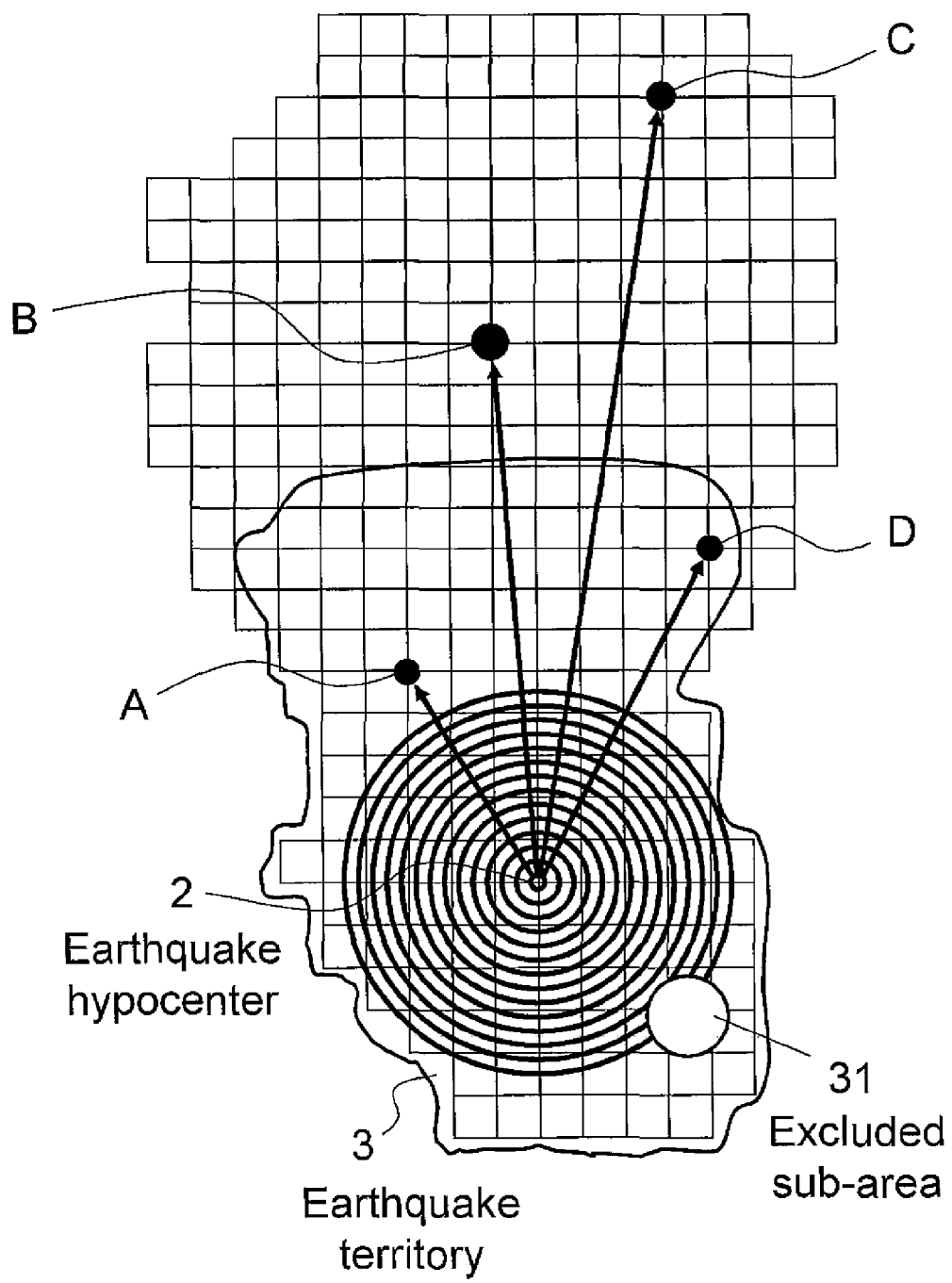
FIG. 4 illustrates an example of an earthquake territory and geographical locations associated with a portfolio of objects or values.

By means of the portfolio definition module 101 a user interface 111 for defining a portfolio of values or objects associated with a geographical area is provided to the user of the system 1. As is illustrated in FIG. 2, in step S1, the portfolio is defined by the user. For example, the portfolio is given an identifier such as a name or a number. Portfolio data is stored in a portfolio data store 152 of database 15. In step S11, the geographical locations A, B, C, D to be associated with the portfolio are defined as shown in FIG. 4. For example, the geographical locations A, B, C, D are defined by making selections from a list or by specifying the geographical locations in a map shown graphically on display 11. Coordinates or other location information defining the geographical locations A, B, C, D are stored in the portfolio data store 152 of database 15 assigned to the portfolio defined in step S1. FIG. 3 shows an example of an individual geographical location A, associated with coordinates of a coordinate system 5 and related to local portfolio assets 4, comprising local portfolio objects 4'.

In step S12, weighting factors for the geographical locations A, B, C, D to be associated with the portfolio are received from the user, e.g. via user interface 111. For example, the weighting factors are selected for weighting according to power output, e.g. 1 M U5D/MW (moment magnitude), according to reconstruction value, or another criteria selected by the user. The weighting factors are stored in the portfolio data store 152 of database 15, assigned in each case to the geographical data defining the geographical locations of the portfolio. Table 1 shows different examples of weighting factors assigned to the geographical locations A, B, C, D.

TABLE 1

| Geographical Location | Example 1 Nominal Value (e.g. 1 M U5D/MW) | Example 2 Operation al Characteristics and Civil Works (M U50) |
|---|---|---|
| A | 10'000 | 15'560 |
| B | 2'600 | 8'510 |
| C | 2'100 | 3'930 |
| D | 2'100 | 3'670 |

In step S13, a minimum total nominal event loss and a maximum total nominal event loss (or impact) are received from the user, e.g. via user interface 111, or determined automatically based on the nominal values defined in step S12. The defined values of the minimum and maximum total nominal event loss are stored for the portfolio in the portfolio data store 152 of database 15. In step S14, a coverage amount is received from the user and stored for the portfolio in the portfolio data store 152 of database 15. In step S2, the portfolio definition module 101 receives and stores earthquake related parameters to be associated with the portfolio. In step S21, received from the user, e.g. via user interface 111, is earthquake territory data which defines a geographical area, The portfolio is limited to earthquake events occurring in the geographical area defined by the earthquake territory data, i.e. the earthquake territory 3, For example, the earthquake territory 3 is defined by a set of coordinates defining the perimeter of the respective geographical area, In an embodiment, the earthquake territory data also defines excluded geographical sub-areas 31 which are to be excluded from the earthquake territory 3, e.g. an area of a defined radius around a dam, The earthquake territory data is stored for the portfolio in the portfolio data store 152 of the database 15, In an embodiment, it is also possible for the user to specify for the portfolio a minimum magnitude level, e.g. 5.5 Mw (Moment Magnitude); earthquakes having a magnitude below this level, will be ignored for the portfolio.

In step S22, received from the user, e.g. via user interface 111, are parameters and mathematical operations for defining an equation I=f(M, Dist) which is used to calculate, for a geographical location, a local earthquake intensity I, based on a given distance Dist of the geographical location from a hypocenter of an earthquake event, and a given earthquake magnitude Magn of the earthquake event (e.g. Moment Magnitude), For example, the mathematical equation is defined as shown below, and the user specifies and/or alters its parameters $c_1$, $c_2$, $c_3$, $c_4$:

$$I = c_1 + c_2 \text{Magn} - c_3 \log \text{Dist} - c_4 \text{Dist} \quad (1)$$

For example, the default values for the parameters are $c_1=6.4$, $c_2=7.45$, $c_3=7.95$, and $c_4=0, 0$. Alternatively, the user may define its own equation or attenuation formula, and associated parameters for determining the local intensities. The equation and its associated parameters are stored for the portfolio in the portfolio data store 152 of database 15.

In step S23, received from the user, e.g. via user interface 111, are impact (or damage) ratios for different earthquake intensity levels, Table 2 illustrates an example of impact ratios for shaking intensities, Shaking intensities in the range of VI-VII lead to damages to ordinary masonry buildings, but hardly to a collapse, Concrete buildings would get damaged at levels in the range VII-VIII. The impact ratios are stored for the portfolio in an impact (or damage) ratio table 151 of the database 15.

TABLE 2

| | Default Values | | Alternative User Selection | |
|---|---|---|---|---|
| Intensity | Impact Ratio | | Intensity | Impact Ratio |
| <VII.O | 0% | | <x | 0% |
| >=VII.O | 10% | | >=... | % |
| >=VII.2 | 20% | | >=... | % |
| >=VII.4 | 30% | | >=... | % |
| >=VII.6 | 40% | | >=... | % |
| >=VII.8 | 50% | | >=... | % |
| >=VIII.O | 60% | | >=... | % |
| >=VIII.2 | 70% | | >=... | % |
| >=VIII.4 | 80% | | >=... | % |
| >=VIII.6 | 90% | | >=... | % |
| >=VIII.8 | 100% | | >=y | % |

Step S3 is executed by means of the earthquake data module 103. As is illustrated in FIG. 5, in step S3, earthquake data, including the location of a hypocenter 2 (defined by its longitude, latitude, and depth) or epicenter and the magnitude of areal or simulated (hypothetical) earthquake, is received in processor means 1'. By means of the earthquake data module 103 a user interface for entering the earthquake data with data entry means 12 is provided to the user of the system 1. Alternatively or in addition, the earthquake data from earthquake data providers 91 can be received via telecommunications network 9. The earthquake data providers 91 include seismological measurement stations and/or data centers. The earthquake data is stored in database 15. In an embodiment, in step S21, identification data of the reporting agency, e.g. NEIC (National Earthquake Information Centre) which determines the earthquake location and magnitude is received from the user, e.g. via user interface 111, and stored for the portfolio in the portfolio data store 152 of database 15.

In step S4, by means of the intensity calculation module 104 the local intensities values for the geographical locations associated with the portfolio are generated. In step S41, generated is the distance of the geographical locations A, B, C, D from the earthquake hypocenter 2, as defined by the earthquake data received in step S3. For example, the distance Dist is calculated based on the coordinates (longitude, latitude) and depth of the earthquake's hypocenter 2, as shown below:

$$D = \cos(lat1) \cdot \cos(lon1) \cdot \cos(lat2) \cdot \cos(lon2) +$$
$$\cos(lat1) \cdot \sin(lon1) \cdot \cos(lat2) \cdot \sin(lon2) +$$
$$\sin(lat1) \cdot \sin(lat2) \quad (2)$$

$$\text{Dist} = \sqrt{(\alpha \cdot \cos(D) \cdot 6378km)^2 + \text{Depth}^2} \quad (3)$$

In step S42, the local (shaking) intensity is generated in each case for the portfolio's geographical locations A, B, C, D. The individual local intensity values are calculated using 20 the equation defined and stored for the portfolio in step S22, based on the earthquake magnitude and the respective distances from the earthquake's hypocenter 2.

In step S5, the earthquake impact (or damage) index as an indicator of the impact or damage caused by the earthquake to the portfolio of values or objects associated with the geographical locations A, B, C, D is generated by means of the index calculation module 105.

In step S51, for the geographical locations A, B, C, D, the impact (or damage) ratios corresponding to the local intensity value are determined in each case from the impact (or 5 damage) ratio table 151 defined in step S23.

In step S52, the impact (or damage) ratios for the portfolio's geographical locations A, B, C, D are weighted in each case by the respective weighting factors. Table 3 shows an example based on the nominal values from Table 1, assuming local intensity values that result in impact ratios of 60% and 10% for geographical locations B or C, respectively, and 0.0% for the geographical locations A and D. Weighting nominal values with the respective impact ratios results in nominal loss values for the geographical locations A, B, C, D.

TABLE 3

| | Nominal Value (1 M U5D/MW) | Impact Ratio | Nominal Loss (Nominal Value * Impact Ratio) |
|---|---|---|---|
| A | 10'000 | 0% | 0 |
| B | 2'600 | 60% | 1'560 |
| C | 2'100 | 10% | 210 |
| D | 2'100 | 0% | 0.0 |
| Total nominal event Loss: | | | 1'770 |

In step S53, the impact (or damage) index is generated as the total nominal loss value by adding up the weighted impact ratios for the portfolio's geographical locations A, B, C, D. In 15 other words, the total nominal loss value is calculated as the sum of nominal losses at each geographical location associated with the portfolio.

In (optional) step S54, an event loss factor is generated as a ratio of the event loss or impact exceeding the minimum total nominal event loss, but not exceeding the maximum total nominal event loss, divided by the difference of the maximum total nominal event loss minus the minimum total nominal event loss defined in step S13. As illustrated in Table 4, 5 with a maximum total nominal event loss of 13'000, an event loss factor of 13.6% results for the total nominal event loss of 1'770 of Table 3. For a total nominal event loss exceeding or equal to the maximum total nominal event loss, the event loss factor is 100%.

TABLE 4

| Total Nominal Event Loss | Event Loss Factor (Final Payout Percentage) | User's Alternative Payout Scheme |
|---|---|---|
| 0 | 0% | <=x |
| 1'770 | 13.6% | |
| ... | ... | ... |
| 7'870 | 60% | |
| ... | ... | ... |
| >=13'000 | 100% | >=y |

In (optional) step S55, the payout module 102 generates the payout amount based on the coverage amount defined in step S14 and the event loss factor. For example, for a total coverage amount of 100M USD, the event loss factor of 13.6% results in a payout of 13.6M USD. As indicated in Table 4, rather than just a maximum total nominal event loss and a linear payout scheme, in step S13, the user may define, e.g. via user interface 111, an alternative (e.g. non linear) payout scheme for the portfolio.

TABLE 5

| Example | Magnitude | Depth | Distance | Nominal Event Loss | Event Loss Factor (Payout Percentage) |
|---|---|---|---|---|---|
| i) | 7.5 Mw | 10 km | 70 km | 13'180 | 100% |
| ii) | 8.0 Mw | 10 km | 300 km | 1'150 | 8.9% |
| iii) | 5.5 Mw | 5 km | 40 km | 260 | 2.0% |

Table 5 shows three examples of earthquake events and resulting event loss factors for different geographical locations.

One or more functions for further processing of the impact (or damage) index can be executed by the application module 105. A simulation function defines different sets of earthquake data for hypothetical earthquakes affecting hypothetically the geographical locations A, B, C, D. For each set, the simulation function stores the impact index assigned to the earthquake data. The simulation function makes it possible to forecast impacts/damages estimated for different earthquakes. For purposes of urban planning, at least some of the portfolio objects are only virtual (planned) objects and the simulation function helps to select locations of planned objects with regards to minimum earthquake impact/damage. An interface function transmits the impact index via communication link 81 to external entity 8 for printing, displaying, storing or further processing of the impact index, respectively. A trigger function compares the impact index to a defined threshold value and triggers execution of a further function, if the impact index exceeds the threshold value. For example, the further function is an alarm function activating or displaying alarm indicators, and/or transmitting alarm messages. In the context of a structured financial product, such as an earthquake insurance fund, the portfolio represents a portfolio of assets, for example an insurance portfolio of insured objects, and the nominal values define asset values, for example insured values of portfolio objects.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the execution or program code for processor means has been associated with specific functional modules and the sequence of the 5 steps has been presented in a specific order, one skilled in the art will understand, however, that the execution code may be structured differently and that the order of at least some of the steps could be altered, without deviating from the scope of the invention.

The invention claimed is:

1. An earthquake damage prediction and prevention system for determining an impact or damage caused by an earthquake to objects associated with different geographical locations, the system comprising:
   a central unit including a filter module to select and collect earthquake related data of a plurality of network units and a network interface module to access at least one of the network units by the filter module;
   an early warning unit, wherein the early warning unit is a grid of decentralized controlled earthquake detection centers and wherein the geographical locations are determined based on transmitted signals of the early warning unit;
   a storing unit to store at least one impact ratio table, the impact ratio table having geographical and/or topographical data coordinates of the different geographical locations;
   an intensity calculation module including a coordinates processor to generate geometric distances of the geographical locations from a hypocenter/epicenter, wherein the intensity calculation module includes a propagation calculation unit to generate local intensity values based upon the generated geometric distances and a given earthquake magnitude by a stored parameterization including variable weight parameters, wherein the generated geometric distances are stored and assigned to the corresponding geographical locations in the impact ratio table;
   a user interface to receive from a plurality of users at least one of the variable weight parameters and/or at least one impact ratio for different earthquake intensity levels indicative of the impact or damage caused by an earthquake to an object and/or at least one object parameter defining earthquake exposed structures of the object; and
   an index calculation module to generate an impact index for the geographical locations by determining in each case from the impact ratio table the impact ratio for a local intensity at the respective geographical location, and add up the impact ratios weighted in each case by a weighting factor assigned to the respective geographical location, wherein the index calculation module weighs the variable weight parameters and/or generated impact ratios and/or object parameter based on those received by the plurality of users.

2. The system of claim 1, further comprising:
   an alarm unit to generate and transmit an electrical stimulus pulse to activate automated alarm systems and/or damage intervention devices.

3. The system of claim 2, wherein the automated alarm systems are accessible and enactable by the central unit of the system over the network interface allowing for their state transition.

4. The system according to claim 2, wherein the activation is bound to a definable threshold value of the system, wherein the threshold changes at high electric stimulus pulse rates for the automated alarm systems and/or damage intervention devices.

5. The system according to claim 1, wherein the geographical location is determined based on transmitted signals of the early warning unit.

6. The system according to claim 1, wherein the early warning unit includes sensors to detect emission of radon and/or a telemetric network of conductive metal rods inserted in the ground to detect seismic electric signals and/or seismic sensors to measure foreshocks of an earthquake and/or a history module having historical data of smaller magnitude earthquakes serving as input values and initial start parameters to the propagation calculation unit generating local intensity values for larger magnitude earthquakes based on the smaller magnitude earthquakes.

7. The system according to claim 1, wherein the weighting factors are based on a nominal value associated with the geographical location, the impact ratios weighted by the weighting factors being indicative in each case of a nominal loss at a geographical location and/or the impact index is indicative of a total nominal event loss, wherein the index calculation module generates an event loss factor as a ratio of an event loss exceeding the minimum total nominal event loss, but not exceeding the maximum total nominal event loss, and a difference of the maximum total nominal event loss and the minimum total nominal event loss.

8. The system according to claim 7, further comprising:
   a portfolio data store including a coverage amount for an object or a portfolio of objects; and
   a payout module to generate a payout amount by multiplying the event loss factor with the coverage amount.

9. The system according to claim 1, wherein the user interface receives from the plurality of users at least one of the impact ratios for different earthquake intensity levels, the weighting factors assigned to the geographical locations, and parameters and mathematical operations for defining the equation.

10. The system according to claim 1, wherein weighting of the variable weight parameters and/or generated impact ratios and/or object parameter based on the parameter received by the plurality of users is conducted dynamically by the system.

11. An earthquake damage prediction and prevention system for determining an impact index indicative of the impact or damage caused by an earthquake to a portfolio of values or objects associated with different geographical locations, the system comprising:

a central unit including a filter module to select and collect earthquake related data of a plurality of network units and a network interface module to access at least one of the network units by the filter module;

an early warning unit, wherein the early warning unit is a grid of decentralized controlled earthquake detection centers and wherein the geographical locations are determined based on transmitted signals of the early warning unit;

a storing unit to store an equation defined for calculating for a geographical location a local earthquake intensity based on a given distance of the geographical location from a hypocenter of an earthquake, and a given earthquake magnitude of the earthquake;

at least one impact ratio table storing unit to store the geographical locations in each case impact ratios for different earthquake intensity levels;

a portfolio data storing unit to store geographical locations and individual weighting factors assigned to the geographical locations;

an intensity calculation module to calculate geometric distances of the geographical locations from a hypocenter of an earthquake event, and to calculate local intensify values for the geographical locations by applying in each case the equation to the magnitude of the earthquake event and the geometric distance of the respective geographical location from the hypocenter; and an index calculation module to calculate an impact index for the geographical locations by determining in each case from the impact ratio table the impact ratio for the local intensity at the respective geographical location, and add up the impact ratios weighted in each case by a weighting factor assigned to the respective geographical location.

12. The system of claim 11, wherein the weighting factors are indicative in each case of a nominal value associated with the geographical location, the impact ratios weighted by the weighting factors are indicative in each case of a nominal loss at a geographical location, the impact index is indicative of a total nominal event loss, the portfolio data storing unit further includes a minimum total nominal event loss and a maximum total nominal event loss for a portfolio, and the index calculation module calculates an event loss factor as a ratio of an event loss exceeding the minimum total nominal event loss, but not exceeding the maximum total nominal event loss, and a difference of the maximum total nominal event loss and the minimum total nominal event loss.

13. The system of claim 12, wherein the portfolio data storing unit further includes a coverage amount for a portfolio, and the system further comprises:

a payout module configured to calculate a payout amount by multiplying the event loss factor with the coverage amount.

14. The system of claim 11, wherein the user interface receives from a user at least one of the impact ratios for different earthquake intensity levels, the weighting factors assigned to the geographical locations, and parameters and mathematical operations for defining the equation.

15. An earthquake damage prediction and prevention method for determining an impact index indicative of the impact or damage caused by an earthquake to a portfolio of values or objects associated with different geographical locations, the method comprising:

selecting and collecting by a filter module earthquake related data of a plurality of network units;

accessing by a network interface module at least one of the network units by the filter module;

determining geographical locations based on transmitted signals of an early warning unit, wherein the early warning unit is a grid of decentralized controlled earthquake detection centers;

storing an equation defined for calculating for a geographical location a local earthquake intensity based on a given distance of the geographical location from a hypocenter of an earthquake, and a given earthquake magnitude of the earthquake;

storing for the geographical locations one or more impact ratio tables, the impact ratio tables defining in each case impact ratios for different earthquake intensity levels;

storing portfolio data including geographical locations and individual weighting factors assigned to the geographical locations;

calculating geometric distances of the geographical locations from a hypocenter of an earthquake event;

calculating local intensity valves for the geographical locations by applying in each case the equation to the magnitude of the earthquake event and the geometric distance of the respective geographical location from the hypocenter; and calculating an impact index for the geographical locations by determining in each case from the impact ratio table the impact ratio for the local intensity at the respective geographical location, and adding up the impact ratios weighted in each case by a weighting factor assigned to the respective geographical location.

16. The method of claim 15, wherein the weighting factors are indicative in each case of a nominal value associated with the geographical location, the impact ratios weighted by the weighting factors are indicative in each case of a nominal loss at a geographical location, the impact index is indicative of a total nominal event loss; and the method further comprises:

storing for a portfolio a minimum total nominal event loss and a maximum total nominal event loss; and calculating an event loss factor as a ratio of an event loss exceeding the minimum total nominal event loss, but not exceeding the maximum total nominal event loss, and a difference of the maximum total nominal event loss and the minimum total nominal event loss.

17. The method of claim 16, wherein the method further comprises:

storing for a portfolio a coverage amount; and calculating a payout amount by multiplying the event loss factor with the coverage amount.

18. The method of claim 15, wherein the method further comprises:

receiving from a user via a user interface at least one of the impact ratios for different earthquake intensity levels, the weighting factors assigned to the geographical locations, and parameters and mathematical operations for defining the equation.

* * * * *